United States Patent
Davis et al.

(10) Patent No.: US 10,995,259 B2
(45) Date of Patent: May 4, 2021

(54) LOW DENSITY GAS HYDRATE INHIBITOR

(71) Applicant: Halliburton Energy Services, Inc., Houston, TX (US)

(72) Inventors: Chesnee Lae Davis, Spring, TX (US); Jessica Paola Ramirez Angulo, Kingwood, TX (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 43 days.

(21) Appl. No.: 16/444,645

(22) Filed: Jun. 18, 2019

(65) Prior Publication Data

US 2020/0317990 A1    Oct. 8, 2020

Related U.S. Application Data

(63) Continuation of application No. PCT/US2019/026249, filed on Apr. 8, 2019.

(Continued)

(51) Int. Cl.
*C09K 8/536* (2006.01)
*E21B 21/08* (2006.01)
(Continued)

(52) U.S. Cl.
CPC .............. *C09K 8/536* (2013.01); *E21B 21/08* (2013.01); *E21B 33/13* (2013.01); *C09K 2208/22* (2013.01); *E21B 47/06* (2013.01)

(58) Field of Classification Search
None
See application file for complete search history.

(56) References Cited

U.S. PATENT DOCUMENTS 3,403,522 A * 10/1968 Henry ..................... E21B 43/34
                                                      62/633
5,076,364 A    12/1991 Hale et al.
(Continued)

FOREIGN PATENT DOCUMENTS

CN    104293326 A    1/2015
CN    104531105 A    4/2015
(Continued)

OTHER PUBLICATIONS

Wu, et al.; "A Study on Inhibitors for the Prevention of Hydrate Formation in Gas Transmission Pipeline"; ScienceDirect; www.sciencedirect.com; Journal of Natural Gas Chemistry; vol. 16, No. 1; 2007; pp. 81-85.

*Primary Examiner* — John J Figueroa
(74) *Attorney, Agent, or Firm* — Tenley Krueger; Parker Justiss, P.C.

(57) ABSTRACT

A method of inhibiting gas hydrate formation in downhole fluids, including providing a downhole fluid and mixing the downhole fluid with an aqueous gas thermodynamic hydrate inhibitor formulation to form a downhole fluid mixture. A concentration of lithium chloride in the downhole fluid mixture is at least about 1 wt % and a density of the downhole fluid mixture is in a range of about 1.08 to 1.3 gm/cm$^3$ at a downhole temperature of about 50° F. or less and a downhole differential pressure of about 500 psi or higher. An aqueous gas thermodynamic hydrate inhibitor formulation and oil and gas well drilling system including such a formulation are also disclosed.

8 Claims, 2 Drawing Sheets

Related U.S. Application Data

(60) Provisional application No. 62/713,203, filed on Aug. 1, 2018.

(51) Int. Cl.
*E21B 33/13* (2006.01)
*E21B 47/06* (2012.01)

(56) References Cited

U.S. PATENT DOCUMENTS

| | | |
|---|---|---|
| 6,080,704 A | 6/2000 | Halliday et al. |
| 7,055,628 B2 * | 6/2006 | Grainger .................. C09K 8/38 |
| | | 175/66 |
| 8,887,815 B2 | 11/2014 | Morrison |
| 8,932,996 B2 | 1/2015 | Falana et al. |
| 9,169,429 B2 | 10/2015 | Tej et al. |
| 2007/0054812 A1 | 3/2007 | Lugo et al. |
| 2008/0135302 A1 * | 6/2008 | Zhang ..................... C09K 8/36 |
| | | 175/70 |
| 2009/0008095 A1 * | 1/2009 | Duncum ................ C09K 8/265 |
| | | 166/292 |
| 2010/0163255 A1 * | 7/2010 | Horton ............... B01D 53/1468 |
| | | 166/403 |
| 2018/0010031 A1 | 1/2018 | Galindo et al. |

FOREIGN PATENT DOCUMENTS

| | | |
|---|---|---|
| CN | 104830291 A | 8/2015 |
| WO | 2010045520 A1 | 4/2010 |
| WO | 2015120160 A1 | 8/2015 |
| WO | 2017040824 A1 | 3/2017 |

\* cited by examiner

LOW DENSITY GAS HYDRATE INHIBITOR

CROSS-REFERENCE TO RELATED APPLICATION

This application claims the benefit of WO Application Serial No. PCT/US2019/026249, filed by Chesnee Lae Davis, et al. on Apr. 8, 2019, entitled "LOW DENSITY GAS HYDRATE INHIBITOR," which claims priority to U.S. Provisional Application Ser. No. 62/713,203, filed by Chesnee Lae Davis, et al. on Aug. 1, 2018, entitled "LOW DENSITY GAS HYDRATED INHIBITOR," commonly assigned with this application and incorporated herein by reference in their entirety.

BACKGROUND

Gas hydrates are non-stoichiometric crystalline solids formed by water molecules in the presence of gaseous or volatile liquid molecules at suitable combinations of low temperatures and high pressures. The inhibition of hydrates in the oil and gas industry has traditionally been accomplished by adding thermodynamic hydrate inhibitors (THIs) such as methanol and ethylene glycol. THIs are additives that change the hydrate's thermodynamic forming conditions, thus preventing hydrate growth under normal hydrate forming conditions encountered in oil and gas drilling. High concentrations of THIs (e.g., about 10-50% by weight of the water present) are often needed to be effective.

Unfortunately, such concentrations have a number of different drawbacks. For example, such concentrations lead to higher densities and negative effects on rheology when high ethylene glycol concentrations are used. Additionally, high concentrations of the THIs are not environmental friendly (e.g. MeOH), as well as the THIs can be costly to both use and recover.

What is needed in the art is a new formulation of THIs that does not experience the drawbacks of prior art THI formulations.

BRIEF DESCRIPTION

Figure 1:
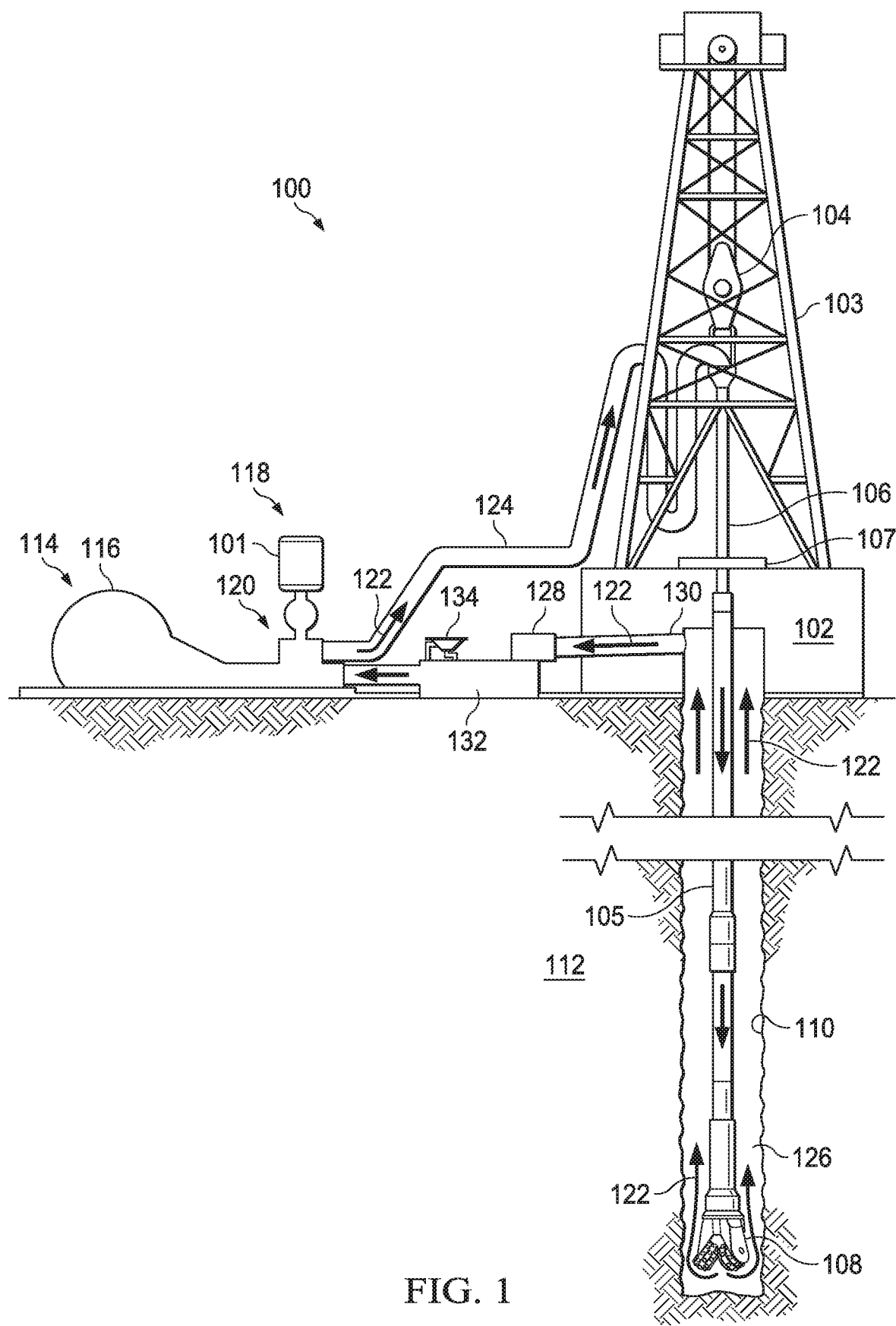
Figure 2:
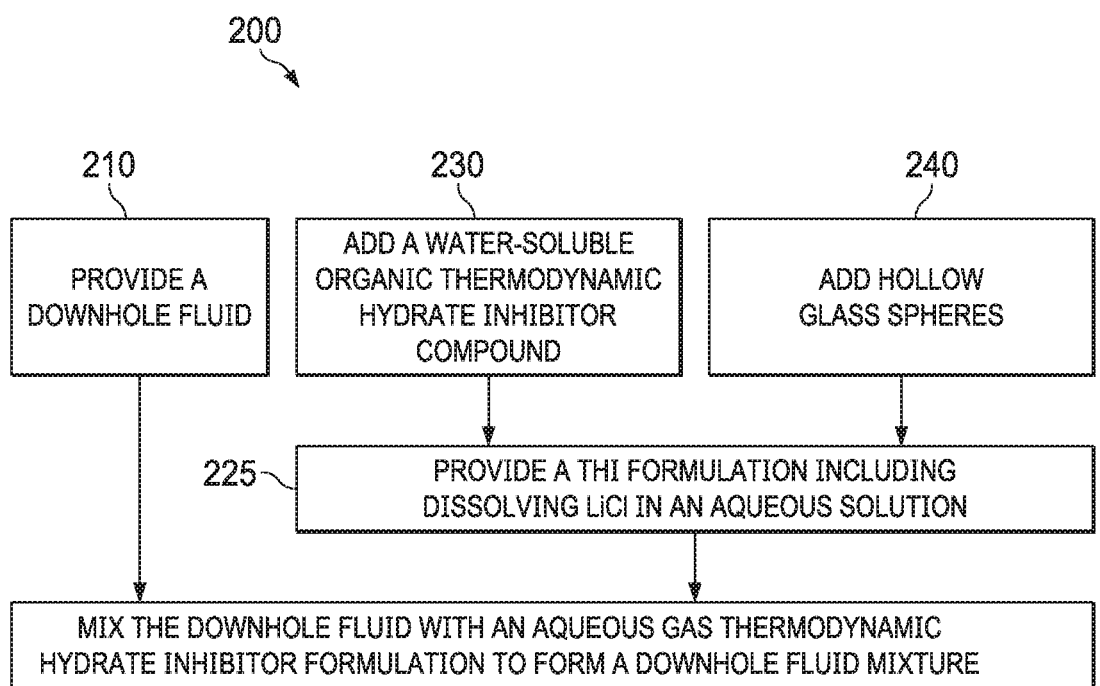

Reference is now made to the following descriptions taken in conjunction with the accompanying drawings/tables, in which:

FIG. 1 presents a schematic view an illustrative embodiment of an oil and gas well drilling system, using the THI formulation and method of inhibiting gas hydrate formation in downhole fluids in accordance to embodiments of the disclosure; and FIG. 2 present a schematic flowchart of an illustrative embodiment of a method of inhibiting gas hydrate formation in downhole fluids, including any of the embodiments of the THI formulation or use in the well systems disclosed herein.

DETAILED DESCRIPTION

The present disclosure is based, at least in part, on the acknowledgment that current day THIs have many different drawbacks. The present disclosure, based upon this acknowledgment, has recognized that a new THI combination (referred to herein as an aqueous gas hydrate thermodynamic inhibitor formulation or THI formulation) that will allow for adequate hydrate inhibition, while maintaining density/viscosity in the requested range, would address many of the drawbacks of existing THIs. As part of the present disclosure has realized that the addition of THIs including lithium chloride, LiCl (e.g., among others), certain low molecular weight low density glycol ether solvents and/or gluconate salts and/or glycerol, can facilitate adequate hydrate inhibition while maintaining a density of a downhole fluid mixture in the desired range, and maintaining a low viscosity conducive to pumping the downhole fluid mixture under the downhole high pressure and low temperature conditions of an oil and gas well drilling system environment.

As part of the present disclosure, we recognized that lower molar mass of LiCl (42.4 gm/mol), e.g., as compared to sodium chloride, NaCl (58.4 g/mol) allows relatively greater molar amounts of LiCl to be added to the downhole fluid mixture (e.g., about 38 percent more) as compared NaCl, and thereby inhibit hydrate formation while maintaining a density of the downhole fluid mixture below 11.0 lb/gal (1.3 gm/cc) at downhole pressures and temperatures at further discussed below. Additionally, as part of the present disclosure we recognized that the greater solubility of LiCl (e.g., about 84 gm/100 ml or 84 wt % at 25° C.) as compared to NaCl (e.g., about 36 wt % at 25° C.) can facilitate adding greater amounts of LiCl as a THI to downhole fluid mixtures as compared to NaCl.

We believe that prior to the present disclosure, water based drilling fluids in the density range of 9 to 11.0 lb/gal in deep-water applications was not recognized. For example, prior to the recognitions of the present disclosure, none of the available gas hydrate inhibitors allowed for the implementation of the required density range and/or rheology targets. We believe that the water-based drilling fluid mixtures in the density range of 9 to 11.0 lb/gal according to the present disclosure will reduce the environmental issues as compared to using oil based drilling fluids in deep-water applications.

FIG. 1 presents a schematic view an illustrative embodiment of an oil and gas well drilling system 100, the system 100 embodiments using any of the THI formulations 101 and methods of inhibiting gas hydrate formation in downhole fluids in accordance to the disclosure.

The system 100 illustrates the use of a downhole fluid mixture 122 which can include any of the embodiments of a THI formulation 101 as disclosed herein. FIG. 1 generally depicts a land-based drilling system. Those skilled in the pertinent art would understand the system components described herein are equally applicable to water-based drilling system for subsea drilling operations employing floating or sea-based platforms and rigs, without departing from the scope of the disclosure.

As illustrated, the drilling system 100 may include a drilling platform 102 that supports a derrick 103 having a traveling block 104 for raising and lowering a drill string 105. The drill string 105 may include, but is not limited to, drill pipe and coiled tubing, as generally known to those skilled in the art. A kelly 106 may support the drill string 105 as it is lowered through a rotary table 107. A drill bit 108 may be attached to the distal end of the drill string 105 and may be driven either by a downhole motor and/or via rotation of the drill string 105 from the well surface. The drill bit 108 may include, but is not limited to, roller cone bits, polycrystalline diamond compact (PDC) bits, natural diamond bits, any hole openers, reamers, coring bits, etc. As the drill bit 108 rotates, it may create a wellbore 110 that penetrates various subterranean formations 112.

A pump-reservoir 114 of the system 100 can provide a downhole fluid 116 which can be any fluid used in any one of a number of stages of a downhole oil or gas drilling operation. For instance, the fluid 116 can include the constituents to support forming any one of a drilling fluid (e.g., drilling mud), a drill-in fluid, a completion fluid, a packer fluid or other fluids, as familiar to those skilled in the pertinent art.

A reservoir 118 of the system 100 can provide a source of the THI formulation 101. The THI formulation 101 can be mixed with the downhole fluid 116 by circulating the downhole fluid 116 and the THI formulation 101 in a mixing module 120 to form a downhole fluid mixture 122.

The pump-reservoir 114 (e.g., a mud pump) can circulate the downhole fluid mixture 122 through a feed pipe 124 and to the kelly 106, which in turn conveys the downhole fluid mixture 122 downhole through the interior of the drill string 105 and through one or more orifices in the drill bit 108. The downhole fluid mixture 122 may then be circulated back to the surface via an annulus 126 defined between the drill string 105 and the walls of the wellbore 110. At the surface, the recirculated or spent downhole fluid mixture 122 may exit the annulus 126 and may be conveyed to one or more fluid processing unit(s) 128 via an interconnecting flow line 130. The fluid processing unit(s) 128 may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The fluid processing unit(s) 128 may further include one or more sensors, gauges, pumps, compressors, and the like used store, monitor, regulate, and/or recondition the drilling fluid.

After passing through the fluid processing unit(s) 128, a "cleaned" downhole fluid mixture 122 may be deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the system 100 to facilitate its proper function, without departing from the scope of the scope of the disclosure. One or more drilling fluid additives may be added to the downhole fluid mixture 122 via a mixing hopper 134 communicably coupled to or otherwise in fluid communication with the retention pit 132. The mixing hopper 134 may include, but is not limited to, mixers and related mixing equipment known to those skilled in the art. Alternatively, the drilling fluid additives may be added to the downhole fluid mixture 122 at any other location in the drilling assembly 100 as familiar to those skilled in the pertinent art. While FIG. 1 shows only a single retention pit 132, there could be more than one retention pit 132, such as multiple retention pits 132 in series. Moreover, the retention put 132 may be representative of one or more fluid storage facilities and/or units where the drilling fluid additives may be stored, reconditioned, and/or regulated until added to the downhole fluid mixture 122.

One embodiment of the disclosure is an oil and gas well drilling system (e.g., FIG. 1, system 100). The system 100 can include a drill string 105 and a fluid pump 114. The pump 114 can pump a downhole fluid mixture 122 through the drilling string 105 to a drill bit 108 of the drill string 105. The downhole fluid mixture 122 includes a mixture of downhole fluid 116 and an aqueous gas hydrate thermodynamic inhibitor formulation 101, such as any embodiments of the fluid 116 and formation 101 disclosed herein. For instance the formulation 101 can include an aqueous solution including LiCl. A concentration of lithium chloride in the aqueous solution provides at least about 1 wt % LiCl in the downhole fluid mixture 122 formed from mixing a downhole fluid 116 with the formulation 101 and a density of the downhole fluid mixture 122 in a range of about 1.08 to about 1.3 gm/cm$^3$ at a downhole temperature of 50° F. or less and a downhole differential pressure of about 500 psi or higher.

Another embodiment of the disclosure is a method of inhibiting gas hydrate formation in downhole fluids. FIG. 2 present a schematic flowchart of an illustrative embodiment of the method 200, which can include the use of any embodiments of THIs or THI formulations 101, or, for use in any embodiments of the system 100 disclosed herein.

With continuing reference to FIGS. 1 and 2 throughout, embodiments of the method 200 include providing a downhole fluid (e.g., step 210, downhole fluid 116 provided via pump/reservoir 114). The method 200 includes mixing the downhole fluid with an aqueous THI formulation (e.g., step 220, mixing the downhole fluid 116 and the THI formulation 101 in mixing module 120) to form a downhole fluid mixture (e.g., mixture 122). The THI formulation includes sufficient LiCl such that a concentration of LiCl in the downhole fluid mixture is at least about 1 wt % while a density of the downhole fluid mixture is in a range of about 1.08 to 1.3 gm/cm$^3$ (e.g., equal to about 9 to 11.0 lb/gal) at a downhole temperature of 50° F. or less and a downhole differential pressure of about 500 psi or higher.

The density requirements of the downhole fluid mixture are determined by the formation properties, e.g., pore pressure and fracture gradient. The density should be greater than the pore pressure, thus avoiding kicks, and less than the fracture gradient, thus avoiding fracturing the formation and losing fluid. When the density required falls in the range of 9-11 lb/gal, controlling hydrates is problematic because one cannot add sufficient NaCl salt because the added salt increases the fluid density above the required range. Monoethylene glycol (MEG) may be added as a supplement THI, but then, high concentrations of MEG leads to increase fluid viscosity and fluid instability issues. As part of the disclosure, we recognized that when the density of the downhole fluid mixture exceeds 1.3 gm/cm$^3$ then the ability to pump such fluid mixture downhole becomes problematic. On the other hand having a density of the downhole fluid mixture of less than 1.08 gm/cm$^3$ may be technically challenging.

The term differential pressure as used herein refers to the difference between the surface of the drilling system 100, e.g., the pressure at the drilling platform 102 as compared to the downhole pressure at the drill bit 108.

The term thermodynamic inhibitor (THI) as used herein refers to a chemical compound or compounds (e.g., alkali metal halides, or organic molecule as disclosed herein) that when dissolved in an aqueous solution, shift the crystalline equilibrium curve in a direction that lowers the reaction temperature to a level that impedes gas hydrate crystal formation in the solution. The THIs such as disclosed herein are distinct from kinetic hydrate inhibitors which slow the rate of gas hydrate crystals or anti-agglomerate inhibitors which help prevent larger sized hydrate crystal particles from forming.

The present disclosure recognizes that optimizing the composition of a THI formulation that include appropriate amounts of LiCl as a THI (among other combinations of THIs as disclosed herein), is a newly recognized result-effective variable, which in order to provide the desired density range of downhole fluid mixture with inhibited gas-hydrate formation, must account for the downhole pressure and temperature environment and, the solubility, density and viscosity of LiCl alone, or in combination with other THIs disclosed herein, under such downhole pressure and temperature conditions.

As a non-limiting example, consider a well system (e.g., system 100) where the downhole pressure and temperature are in a range of about 250 psi to 2000 and about 50 to 32° F., respectively. In such a downhole environment, the concentration of lithium chloride in the downhole fluid mixture can be in a range from about 1 wt % to about 40 wt %.

Or, consider the well system where the downhole pressure and temperature are in a range are in a range of about 2000 psi to 5000 and about 50 to 32° F., respectively. In such a downhole environment, the concentration of lithium chloride in the downhole fluid mixture can be in a range from about 40 wt % to about 80 wt %.

Or, consider the well system where the downhole pressure and temperature are in a range are in a range of about 5000 psi to 15000 and about 50 to 32° F., respectively, respectively. In such a downhole environment, the concentration of lithium chloride in the downhole fluid mixture can be in a range from about 60 wt % to about 80 wt %.

As further illustrated in FIG. 2, the method 200 can further include dissolving LiCl (or other alkali metal halides) in an aqueous solution to provide the THI formulation (step 225).

In some embodiments, the method 200 can further include adding a water-soluble organic thermodynamic hydrate inhibitor compound to the THI formulation (e.g., step 230).

For instance, for some well system operations having more stringent downhole pressure and temperature environments, the use of THI formulations with LiCl as the sole THI in the formulation may be inadequate to inhibit hydrate formation and/or may result in a downhole fluid mixture with an undesirably high density. Alternatively, for some well system operations, it can be advantageous to reduce the costs of using the THI formulation by using less LiCl by including one or more such organic thermodynamic hydrate inhibitor compounds in the formulation.

In some embodiments of the method 100, the water-soluble organic thermodynamic hydrate inhibitor compound has a molecular weight (MW) of about 800 gm/mol or less. The water-soluble organic thermodynamic hydrate inhibitor compound can be or include one or more of a glycol, a polyglycol, a polyalkyleneoxide, an alkyleneoxide copolymer, a polyalkylene glycol ether, a polyalkyleneoxide glycol ether, a carbohydrate, an amino acid, an aminosulfonate, an alcohol have 1 to 3 carbon atoms, a salt of any of the foregoing compounds, and combinations thereof. Non-limiting examples of such compounds include one or more of ethylene glycol, a diethylene glycol, a triethylene glycol, a tetraethylene glycol, a propylene glycol, a dipropylene glycol, a tripropylene glycol, a tetrapropylene glycol, a polyethylene oxide, a polypropylene oxide, a copolymer of ethylene oxide and propylene oxide, a polyethylene glycol ether, a polypropylene glycol ether, a polyethylene oxide glycol ether, a polypropylene oxide glycol ether, a polyethylene oxide/polypropylene oxide glycol ether, a monosaccharide, a methylglucoside, a methylglucamine, a disaccharide, fructose, glucose, an amino acid, an amino sulfonate, methanol, ethanol, propanol, and isopropanol In some embodiments of the method 100, the water-soluble organic thermodynamic hydrate inhibitor compound can additionally or alternatively be or include a glycol ether solvent having molecular weight of 200 gm/mol or less and in some embodiments 100 gm/mol or less. In some embodiments, to facilitate maintaining the density of the downhole fluid mixture in the desired range of 1.08 to 1.3 gm/cm$^3$, the glycol ether can have a specific gravity of about 1 gm/cm$^3$ or lower, or about 0.96 gm/cm$^3$ or lower, or about 0.96 gm/cm$^3$ or lower (about 20° C. and atmospheric pressure). In some embodiments, to facilitate maintaining the flowability of the downhole fluid mixture, the glycol ether can have a viscosity 2 cP or lower (about 20° C. and atmospheric pressure).

For instance in some such embodiments, the glycol ether can be 2-Methoxyethanol (e.g., MW about 76 gm/mol, density about 0.96 g/cm$^3$, viscosity about 1.72 cP) and/or 2-Ethoxyethanol (e.g., MW about 90 gm/mol, density 0.93 g/cm$^3$, viscosity about 1.84 cP).

For instance, in such some embodiments, the glycol ether solvent can include one or more of one or more of 2-Ethylene Glycol Monopropyl Ether, Diethylene Glycol Methyl Ether, or Diethylene Glycol Monoethyl Ether.

In some embodiments, the amount of the water-soluble organic thermodynamic hydrate inhibitor compound or compounds added to the THI formulation (e.g., as part of step 230) can be adjusted to provide a total concentration in the downhole fluid mixture equal to a value in a range from about 1 wt % to 30 wt %, or from about 1 wt % to 5 wt %, or from about 5 wt % to 10 wt %, or from about 10 wt % to 20 wt %, or from about 20 wt % to 30 wt %.

Other solvents may also work as gas hydrate inhibitors, however as discussed above, the disclosed inhibitors may be particularly advantageous.

In some embodiments, to facilitate maintaining the density of the downhole fluid mixture in the desired range of 1.08 to 1.3 gm/cm$^3$, the method 200 can further include adding hollow glass spheres to the THI formulation (e.g., step 240). Hollow glass spheres may be incorporated into the formulation to reduce the final density of the downhole fluid mixture with the THI to achieve the desired fluid density range for a specific application.

In some such embodiments, the amount of the hollow glass spheres added to the THI formulation (e.g., as part of step 240) can be adjusted to provide a concentration in the downhole fluid mixture equal to a value in a range from about 1 wt % to 20 wt %, or from about 1 wt % to 5 wt %, or from about 5 wt % to 10 wt %, or from about 10 wt % to 20 wt %. In some such embodiments, an average particle size of the hollow glass spheres can be a value in a range of 20 to 50 microns, although other sizes familiar to those skilled in the pertinent art may also be used.

In some embodiments the volume ratio of the downhole fluid to the THI formulation used to form the downhole fluid mixture (step 220) can range from a ratio value in a range from about 10:90 to 90:10, and in some embodiments, from about 10:90 to 20:80, from about 20:80 to 30:70, from about 30:70 to 40:60, from about 40:60 to 50:50, from about 50:50 to 60:40, from about 60:40 to 70:30, from about 70:30 to 80:20 or from about 80:20 to 10:90.

In some embodiments, the amount of gas hydrate inhibitor, can be calculated in a percentage by weight of the weight of the brine to be used. Further to this embodiment, the inhibitor can be added at the end of the mixing, and moreover the percentage of inhibitor to be added can be removed from the brine.

Another embodiment of the disclosure is an aqueous gas thermodynamic hydrate inhibitor formulation for a downhole fluid mixture, such as any of the THI formulations 101 discussed in the content of FIGS. 1 and 2 herein.

The formulation includes an aqueous solution including lithium chloride. The concentration of lithium chloride in the aqueous solution provides at least about 1 wt % LiCl in the downhole fluid mixture formed from mixing a downhole fluid with the formulation, and provides a density of the downhole fluid mixture in a range of about 1.08 to about 1.3 gm/cm$^3$ at a downhole temperature of 50° F. or less and a downhole differential pressure of about 500 psi or higher. The target concentration of LiCl (e.g., at least about 1 wt %) in the formulation can vary depending upon the volume ratio of the downhole fluid to the THI formulation used to form the downhole fluid mixture.

As non-limiting examples, consider an embodiment or the system 100 or method 200 where a volume ratio of downhole fluid:THI formulation mixed in step 225 and in the mixing module 120, equal to 90:10. In some such embodiments the concentration of LiCl in the THI provided (step 225) in the formulation 101 can equal about 10 wt % and 84 wt % (e.g., saturated LiCl) to provide about 1 wt % and 8.4 wt % LiCl concentrations, respectively, in the downhole fluid mixture, Additionally, consider a volume ratio of downhole fluid:THI formulation equal to 10:90. In some such embodiments, the concentration of LiCl in the THI formulation can equal about 1.1 wt % and 9.3 wt % to provide 1 wt % and 8.4 wt % LiCl concentrations, respectively, in the downhole fluid mixture.

Or, consider the well system where the downhole pressure and temperature are in a range of about 250 to 2000 psi and about 50 to 32° F., respectively, and the concentration of LiCl in the downhole fluid mixture in the range from about 1 wt % to about 40 wt %. In such embodiments for volume ratios of downhole fluid:THI formulation equal to 90:10 or 10:90, the concentration of LiCl in the THI formulation can be concentration in a range from about 0.09 wt % to about 36 wt % and from about 0.01 wt % to about 4 wt %, respectively.

Or, consider the well system where the downhole pressure and temperature are in a range of about 2000 to 5000 psi and about 50 to 32° F., respectively, and the concentration of LiCl in the downhole fluid mixture in the range from about 40 wt % to about 80 wt %. In such embodiments for volume ratios of downhole fluid:THI formulation equal to 90:10 or 10:90, the concentration of LiCl in the THI formulation can be concentration in a range from about 36 wt % to about 72 wt % and from about 4 wt % to about 8 wt %, respectively.

Or, consider the well system where the downhole pressure and temperature are in a range of about 5000 to 15000 psi and about 50 to 32° F., respectively, and the concentration of LiCl in the downhole fluid mixture in the range from about 60 wt % to about 80 wt %. In such embodiments for volume ratios of downhole fluid:THI formulation equal to 90:10 or 10:90, the concentration of LiCl in the THI formulation can be concentration in a range from about 54 wt % to about 72 wt % and from about 6 wt % to about 8 wt %, respectively.

In some embodiments, other similar or lower molecular weight alkali metal halides (e.g., NaF, 42.0 gm/mol, LiF, 25.9 gm/mol) can be part of the THI formulation to help maintain the downhole fluid mixture's density under the conditions described above. While LiCl has a higher solubility in water, e.g., as compared to as compared to NaCl (e.g., about 36 wt % at 25° C.), the solubilities of NaF and LiF are relatively more limited (e.g., about 4 wt % and 0.2 wt %, respectively) and therefore have more limited ability to serve as a sole THIs in an aqueous THI formulation. However, embodiments of the THI formulation can include combinations of such alkali metal halides (e.g., two or more of LiCl, LiF or NaF) to permit greater total concentration of these compounds as compared to their individual or sole use of a the THI in the formulation.

Some embodiments of the THI formulation can further include a water-soluble organic thermodynamic hydrate inhibitor compound and/or hollow glass spheres, such as any of the embodiments of the compound and spheres discussed in the context of FIG. 2.

In some embodiments of the THI formulation, it can be advantageous for the formulation to be substantially free of any one or more of sodium chloride, ethylene glycol, methanol or oil.

For instance, for some embodiments of the THI formulation, in addition to LiCl, can include NaCl (e.g., about 5 wt %, about 10 wt %, about 15 wt % or about 20 wt %) to help further mitigate gas hydrate inhibition. However other embodiments of the THI formulation can be substantially free of NaCl (e.g., less than about 5 wt %, and in some embodiments, less than about 3 wt % and in some embodiments, less than about 1 wt %, and in some embodiments, less than about 0.1 wt %) to help mitigate the downhole fluid mixture from having a density that higher than the desired range. For example, in some embodiments, when the down fluid is a drilling mud (e.g., a saltwater drilling mud) having a NaCl concentration of about 3 to 5 wt %, and the THI formulation has a NaCl concentration of about 0.1 wt %, then the downhole fluid mixture can have NaCl concentration from about 2.7 to 4.5 wt % or from 0.3 to 0.5 wt % for downhole fluid:THI formulation volume ratios equal to 90:10 or 10:90, respectively.

Alternatively or additionally, some embodiments of the THI formulation, in addition to LiCl, can include ethylene glycol (MEG) and/or methanol (MeOH) (e.g., about 5 wt %, about 10 wt %, about 15 wt % or about 20 wt % of each of MEG and MeOH) to help further mitigate gas hydrate inhibition. However other embodiments of the THI formulation can be substantially free of MEG and/or MeOH (e.g., less than about 5 wt %, and in some embodiments, less than about 3 wt % and in some embodiments, less than about 1 wt %, and in some embodiments, less than about 0.1 wt %) to help mitigate the downhole fluid mixture from having a density that higher than the desired range and to reduce or avoid reduce environment contamination with these compounds.

Alternatively or additionally, to reduce the environmental issues associated with using oil based drilling fluids embodiments and promote the THIs of the THI formulation remaining dissolved in the aqueous solution of the formulation and in the downhole fluid mixture, the formulation can be substantially free of oil. The term substantially free of oils as means that the concentration of oil in the formulation is less than about 20 wt %, or in some embodiments, less than 10 wt % or less than about 5 wt %, less than about 1 wt %.

Experiments

To further illustrate various features of the disclosed method and THI formulations several non-limiting example studies are presented below. Simulated fluids were modeled using the program PVSim (SunPower Corp. San Jose, Calif.).

To test the benefits of using LiCl as a THI over NaCl as a THI, simulated fluids formulated as an inhibited water based drilling fluid mixture in the density range of about 9 to 10.5 lb/gal and assuming downhole temperatures of 40° F. and 5000, 7000 and 15000 psi. Historically at these conditions only oil based drilling fluids are suitable. The simulated fluids were formulated to further include MEG as an additional THI.

The freezing point depression test was used as a screening method for determining viable candidates. Results showed that a combination of glycol ethers and/or Lithium Chloride are particularly interesting. The addition of the aforementioned into a clear fluid significantly reduced the freezing point of the solution. However, PVT (Production/Pilot Validation) testing may be used to confirm gas hydrate inhibition.

PVTsim Software was utilized for gas hydrate model simulations for one of LiCl, NaCl brines, an additional salt of CaCl$_2$. As lithium chloride (LiCl) is not on PVTsim database, the mole equivalent (35.7 lb/bbl NaCl brine) was utilized for simulation purposes:

1. 8.7 lb/gal LiCl fluid (35.7 lb/bbl NaCl brine)
2. 8.7 lb/gal NaCl fluid (22 lb/bbl NaCl brine)

Gas hydrate modeling plots were performed consisting of the three specified base-brines at 40° F., three pressure levels (i.e. 5000, 7000 and 15000 psi) to determine their baseline performance (concentrations of inhibitor needed). Additionally, MEG was used for modeling and determining treatment levels. The values in Table 1 present the amounts of MEG required (wt %) required to suppress hydrate formation:

TABLE 1

PVTsim simulation results

|  | 5,000 psi MEG | 7,000 psi MEG | 15,000 psi MEG |
|---|---|---|---|
| 8.7 lb/gal LiCl | 39.70 | 43.40 | 53.00 |
| 8.7 lb/gal NaCl | 43.20 | 46.60 | 55.20 |
| 8.7 lb/gal CaCl$_2$ | 46.60 | 49.50 | 57.30 |

The results of the simulations show that at equivalent weights of LiCl and NaCl added to a downhole fluid mixture, less MEG is needed the inhibit gas-hydrate formation for the simulated LiCl-containing downhole fluid mixture than the simulated NaCl-containing downhole fluid mixture. The ability to use less than 50 wt % of MEG to inhibit gas-hydrate formation is important because often under such downhole pressures and temperatures over 50 wt % MEG results in a downhole fluid mixture viscosity that is so high that there are problems pumping the fluid.

To test the benefits of using selected glycol ethers as THIs over MEG as a THI, freeze point depression were assessed. Glycol ethers are a group of solvents based on alkyl ethers of ethylene glycol or propylene glycol commonly used in paints and cleaners. Most glycol ethers are water-soluble, biodegradable and only a few are considered toxic.

The first step in the screening plan was to measure the freezing point. For screening purposes, samples were tested at −40° C., −35° C., −30° C. and −25° C. using a deep freezer. The freezing point was tested for the aforementioned solutions, using MEG to establish a comparative baseline as illustrated in Table 2 and 3:

TABLE 2

Freezing Point for Inhibition at 40° F. and 7,000 psi

|  | −40° C. | −35° C. | −30° C. | −25° C. |
|---|---|---|---|---|
| MEG | S | S | L | L |
| 2-Methoxyethanol | L | L | L | L |
| 2-Ethoxyethanol | S | L | L | L |
| Ethylene Glycol Monopropyl Ether | S | S | S | S |
| Diethylene Glycol Methyl Ether | S | S | L | L |
| Diethylene Glycol Monoethyl Ether | S | S | S | L |

Note:
S = Solid,
L = liquid

TABLE 3

Freezing Point for Inhibition at 40° F. and 15,000 psi

|  | −40° C. | −35° C. | −30° C. | −25° C. |
|---|---|---|---|---|
| MEG | S | S | L | L |
| 2-Methoxyethanol | L | L | L | L |
| 2-Ethoxyethanol | L | L | L | L |
| Ethylene Glycol Monopropyl Ether | S | S | S | S |
| Diethylene Glycol Methyl Ether | S | S | L | L |
| Diethylene Glycol Monoethyl Ether | S | S | S | L |

Note:
S = Solid,
L = liquid

Those skilled in the art to which this application relates will appreciate that other and further additions, deletions, substitutions and modifications may be made to the described embodiments.

What is claimed is:

1. A method of inhibiting gas hydrate formation in downhole fluids, comprising:
   providing a downhole fluid; and
   mixing the downhole fluid with an aqueous gas thermodynamic hydrate inhibitor formulation to form a downhole fluid mixture, wherein:
   a concentration of lithium chloride in the downhole fluid mixture is at least about 1 wt %, and
   a density of the downhole fluid mixture is in a range of about 1.08 to 1.3 gm/cm$^3$ wherein:
   the concentration of lithium chloride in the downhole fluid mixture is in a range from about 1 wt % to about 40 wt % when the downhole pressure and the downhole temperature are in a range of about 250 psi to 2000 psi and about 50° F. to 32° F., respectively,
   the concentration of lithium chloride in the downhole fluid mixture is in a range from about 40 wt % to about 80 wt % when the downhole pressure and the downhole temperature are in a range of about 2000 psi to 5000 psi and about 50° F. to 32° F., respectively, or
   the concentration of lithium chloride in the downhole fluid mixture is in a range from about 60 wt % to about 80 wt % when the downhole pressure and the downhole temperature are in a range of about 5000 psi to 15000 psi and about 50° F. to 32° F., respectively.

2. The method of claim 1, further including adding a water-soluble organic thermodynamic hydrate inhibitor compound to the aqueous gas hydrate thermodynamic inhibitor formulation.

3. The method of claim 2, wherein the water-soluble organic thermodynamic hydrate inhibitor compound includes a glycol ether solvent, wherein:
   the glycol ether solvent has a specific gravity of about 1 gm/cm$^3$ or lower, and
   a concentration of glycol ether solvent in the downhole fluid mixture is at least about 1 vol %.

4. The method of claim 3, wherein the glycol ether solvent includes one or more of one or more of 2-Methoxyethanol or 2-Ethoxyethanol, 2-Ethylene Glycol Monopropyl Ether, Diethylene Glycol Methyl Ether, or Diethylene Glycol Monoethyl Ether.

5. A method of inhibiting gas hydrate formation in downhole fluids, comprising:
   providing a downhole fluid;

mixing the downhole fluid with an aqueous gas thermodynamic hydrate inhibitor formulation to form a downhole fluid mixture, wherein:
  a concentration of lithium chloride in the downhole fluid mixture is at least about 1 wt %, and
  a density of the downhole fluid mixture is in a range of about 1.08 to 1.3 gm/cm$^3$ at a downhole temperature of 50° F. or less and a downhole differential pressure of about 500 psi or higher; and adding hollow glass spheres to the aqueous gas hydrate thermodynamic inhibitor formulation.

6. An oil and gas well drilling system, the system, comprising:
  a drill string; and
  a fluid pump configured to pump a downhole fluid mixture through the drilling string to a drill bit of the drill string, wherein the downhole fluid mixture includes a mixture of downhole fluid and an aqueous gas hydrate thermodynamic inhibitor formulation, the formulation including:
  an aqueous solution including lithium chloride, wherein:
    a concentration of lithium chloride in the aqueous solution provides at least about 1 wt % LiCl in the downhole fluid mixture formed from mixing a downhole fluid with the formulation and a density of the downhole fluid mixture in a range of about 1.08 to about 1.3 gm/cm$^3$ wherein:
  the concentration of lithium chloride in the downhole fluid mixture is in a range from about 1 wt % to about 40 wt % when the downhole pressure and the downhole temperature are in a range of about 250 psi to 2000 psi and about 50° F. to 32° F., respectively,
  the concentration of lithium chloride in the downhole fluid mixture is in a range from about 40 wt % to about 80 wt % when the downhole pressure and the downhole temperature are in a range of about 2000 psi to 5000 psi and about 50° F. to 32° F., respectively, or
  the concentration of lithium chloride in the downhole fluid mixture is in a range from about 60 wt % to about 80 wt % when the downhole pressure and the downhole temperature are in a range of about 5000 psi to 15000 psi and about 50° F. to 32° F., respectively.

7. The system of claim 6, wherein the downhole fluid mixture is one of a drilling fluid, drill-in fluid, a completion fluid or a packer fluid.

8. An oil and gas well drilling system, the system, comprising:
  a drill string; and
  a fluid pump configured to pump a downhole fluid mixture through the drilling string to a drill bit of the drill string, wherein the downhole fluid mixture includes a mixture of downhole fluid and an aqueous gas hydrate thermodynamic inhibitor formulation, the formulation including:
  an aqueous solution including lithium chloride, wherein:
    a concentration of lithium chloride in the aqueous solution provides at least about 1 wt % LiCl in the downhole fluid mixture formed from mixing a downhole fluid with the formulation and a density of the downhole fluid mixture in a range of about 1.08 to about 1.3 gm/cm$^3$ at a downhole temperature of 50° F. or less and a downhole differential pressure of about 500 psi or higher; and
  hollow glass spheres.

\* \* \* \* \*